United States Patent [19]
Allison et al.

[11] Patent Number: 6,047,258
[45] Date of Patent: Apr. 4, 2000

[54] RENTING/LEASING INSTRUMENT OPTIONS USING SATELLITE POSITIONING SYSTEM

[75] Inventors: Michael Timo Allison, Santa Clara; Christopher Haosan Wei, Sunnyvale, both of Calif.

[73] Assignee: Trimble Navigation Limited, Sunnyvale, Calif.

[21] Appl. No.: 08/909,364

[22] Filed: Aug. 11, 1997

[51] Int. Cl.[7] .................................................. H04L 9/00
[52] U.S. Cl. ............................ 705/1; 380/23; 380/25; 380/29
[58] Field of Search ............................... 705/1, 32, 44; 380/4, 23, 25, 29; 702/85, 107

[56] References Cited

U.S. PATENT DOCUMENTS

| | | | |
|---|---|---|---|
| 4,599,489 | 7/1986 | Cargile | 380/4 |
| 4,609,777 | 9/1986 | Cargile | 380/4 |
| 5,226,080 | 7/1993 | Cole et al. | 380/25 |
| 5,495,411 | 2/1996 | Ananda | 705/32 |
| 5,548,645 | 8/1996 | Ananda | 380/4 |
| 5,592,553 | 1/1997 | Guski et al. | 380/23 |
| 5,638,513 | 6/1997 | Ananda | 713/202 |
| 5,661,807 | 8/1997 | Guske et al. | 380/25 |
| 5,757,916 | 5/1998 | MacDoran et al. | 380/25 |

*Primary Examiner*—Kevin J. Teska
*Assistant Examiner*—Demetra R. Smith
*Attorney, Agent, or Firm*—Boris G. Tankhilevich

[57] ABSTRACT

An apparatus and a method of purchasing or leasing the time dependent option of operation of an instrument are disclosed. An apparatus generates and uses a time dependent password configured to be matched with at least one time dependent parameter in order to activate the instrument. The apparatus includes a time-antispoof device in order to prevent spoofing the purchased time of operation of the instrument. The time-antispoof device includes a satellite navigation receiver in order to enforce the antispoof option.

46 Claims, 4 Drawing Sheets

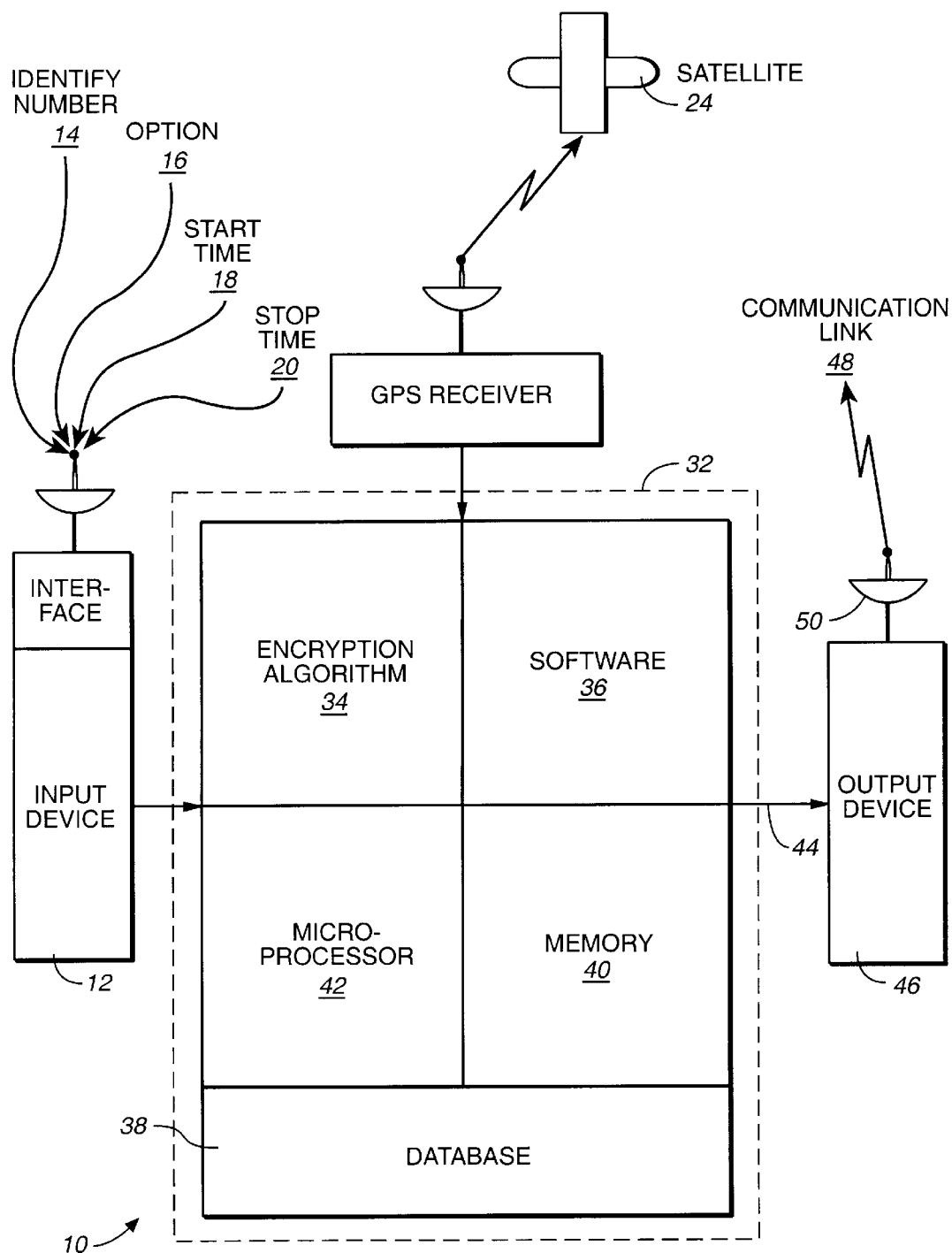
FIG._1

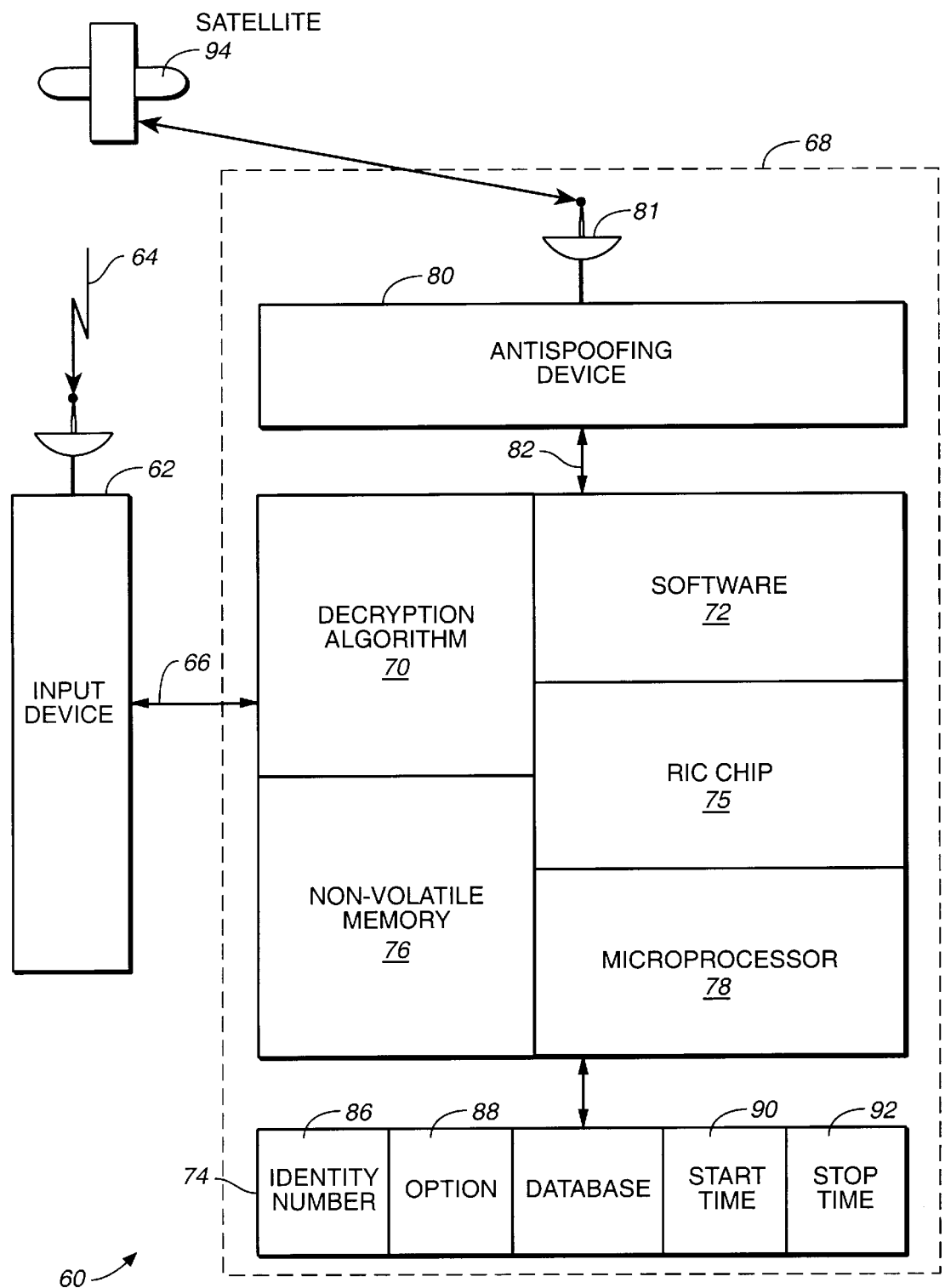
FIG._2

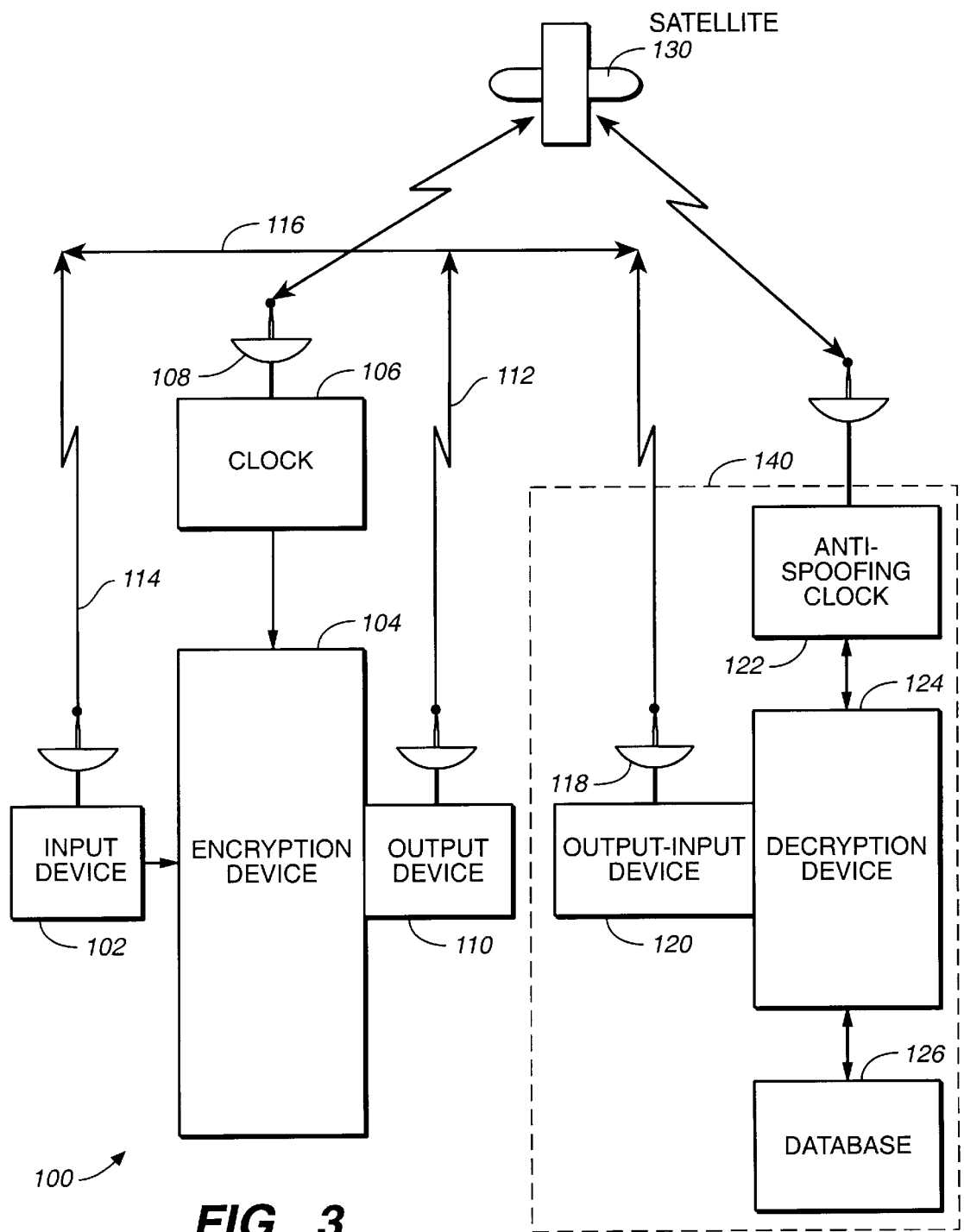
FIG._3

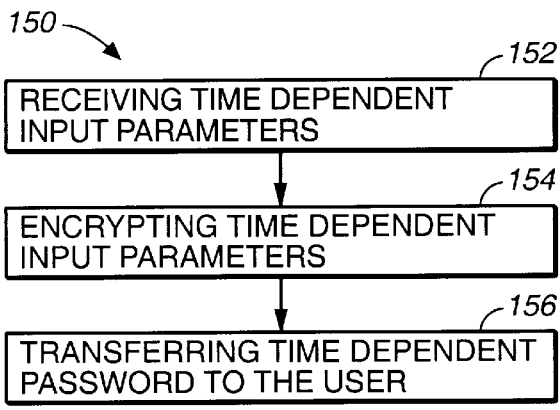
FIG._4
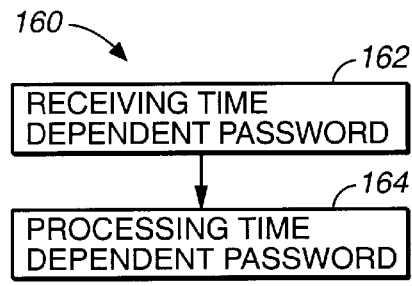
FIG._5
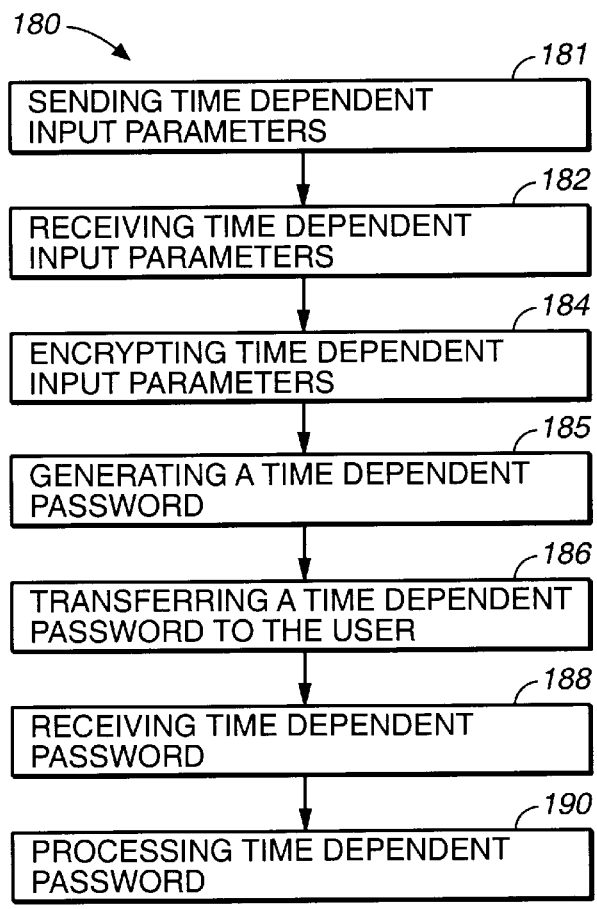
FIG._6

RENTING/LEASING INSTRUMENT OPTIONS USING SATELLITE POSITIONING SYSTEM

BACKGROUND

In the prior art, a customer could choose to rent/lease an electronic instrument with certain software/firmware/hardware features installed as options. The existing product upgrades could also be sold as options.

There are currently two distinct methods for installing options for operating an electronic instrument: (i) Factory installation—an option is installed in the unit without any security requirements prior to shipment; and (ii) User installation—an option is installed by a customer or by a service center with provided passwords to prevent the option being installed in a unit other than one specified by the unit's identification number or being installed into a plurality of units with arbitrary serial numbers.

The options could be high price items. For example, the Real-Time-Kinematic Survey option available for the Trimble 4000SSi Global Positioning System (GPS) receiver is a highly priced item. Currently, an option can be installed only for the lifetime of the product, and the cost of the option reflects the usage for the lifetime of the product.

What is needed is a mechanism that allows one to install an option with a specified start and stop date. Thus, an option can be rented or leased for fixed periods of time for a price less than the price of a lifetime option. This is particularly attractive for surveying in which a surveying contract may only require the use of an option for the duration of the contract.

SUMMARY

The present invention is unique because it allows one to lease an option of operation of an electronic instrument for a limited period of time or to change the already leased option for operation of an instrument to accommodate for an upgrade in the instrument's operation.

One aspect of the present invention is directed to an apparatus for generating a time dependent password useful in operating an instrument. The time-dependent-password-generating (TDPG) apparatus comprises: (1) an input device configured to receive at least one time dependent input parameter for operating the instrument; (2) an encryption device configured to encrypt at least one time dependent parameter and configured to generate a time dependent password; and (3) an output device that outputs the generated time dependent password.

The input parameters can include an identification number of the instrument, at least one chosen-by-the-user option for operating the instrument, a start date to start the operation of the instrument and a stop date to stop the operation of the instrument. The start date and stop date comprise a time window for operation of the instrument.

In one embodiment, the encryption device can comprise a personal computer using an encryption algorithm to encrypt the input parameters in order to generate the time dependent password.

In one embodiment, a SATPS (satellite positioning system) receiver can be used for determining a current time coordinate of the TDPG apparatus, wherein the time dependent password further depends on the current time coordinate.

Another aspect of the present invention is directed to an apparatus utilizing a time dependent password for its activation. The time-dependent-password-utilizing (TDPU) apparatus includes: (1) an input device configured to receive a time dependent password for its activation; and (2) a decryption device configured to process the time dependent password and to match the time dependent password with at least one time dependent parameter in order to activate the TDPU apparatus.

The input device can comprise: (1) a personal computer, (2) a barcode scanner, or (3) an internet network of computers.

In one embodiment, the TDPU apparatus further includes an antispoof timing device configured to determine the current time coordinate of operation of the TDPU apparatus. The leased option is enabled if the current time coordinate is within the time window of operation of the apparatus. Thus, the antispoof timing device can be used to prevent the spoofing of the time window by the user.

In one embodiment, the antispoof timing device can comprise a SATPS receiver for determining the current time coordinate of the apparatus by utilizing SATPS satellite signals.

One more aspect of the present invention is directed to a remotely operated and utilizing a time dependent password (R-TDPU) apparatus for operating an instrument.

The R-TDPU apparatus includes: (1) an input device configured to receive at least one time dependent input parameter for operating the instrument; (2) an encryption device configured to encrypt at least one time dependent parameter and configured to generate a time dependent password; (3) an output device generating the time dependent password; (4) an input-output device configured to transmit at least one time dependent input parameter and configured to receive at least one time dependent password from the output device; (5) a communication link between the input device, the output device and the input-output device; and (6) a decryption device configured to process at least one time dependent password and configured to match at least one time dependent password with at least one time dependent parameter in order to activate the instrument.

BRIEF DESCRIPTION OF THE DRAWINGS

FIG. 1 depicts a generator of a time dependent password.

FIG. 2 illustrates an apparatus for utilizing a time dependent password.

FIG. 3 shows a remotely operated apparatus for utilizing a time dependent password.

FIG. 4 depicts a flow chart for generating a time dependent password.

FIG. 5 is an illustration of a flow chart for utilizing a time dependent password.

FIG. 6 shows a flow chart for remotely operating an instrument using a time dependent password.

THE FULL DESCRIPTION OF THE PREFERRED EMBODIMENTS

FIG. 1 illustrates an apparatus (10) for generating a time dependent password (TDPG-apparatus). The apparatus (10) comprises an input device (12) configured to receive at least one time dependent input parameter for operating the instrument. To generate a time dependent password, the TDPG-apparatus requests a potential customer to submit the following information: the unit's identification number (14) together with an option type (16), at least one start date to start the operation of the instrument (18), and at least one stop date (20) to stop the operation of the instrument. At least one start date and at least one stop date comprise at least one time window for operation of the instrument. It is possible, that the first option of operation of the instrument can be purchased or leased in association with the first time window, that the second option of operation of the instrument can be purchased or leased in association with the second time window and so on.

The input device (12) can be implemented using a personal computer linked to the internet, a modem connected to a standard telephone line, a receiver of radio signals, a barcode scanner, a floppy disk, an optical CD disk, a PCMCIA interface, or any other device having an interface with a communication link to a potential customer.

An encryption device (32) is configured to encrypt the above-mentioned parameters (the unit's identification number (14), an option type (16), a start date (18), and a stop date (20) in order to generate a time dependent password.

In the preferred embodiment, the encryption device (32) comprises a personal computer including a microprocessor (42), a memory (40), a software (36), and a database (38). The encryption device (32) using an encryption algorithm (34) translates the unit's identification number (14), an option type (16), a start date (18), and a stop date (20)) into a time dependent password (44). The database (38) can be used to keep the information of all customers, including their identification numbers, options purchased or leased in the past, and so on. This allows easy upgrades or renewal of already purchased options.

In one embodiment, the encryption device (32) can be implemented using a Pentium® based PC using a Microsoft® operating system Windows® 95. The database (38) can be implemented using the Oracle 8.0 DBMS manufactured by Oracle Corporation, Redwood City, Calif., that is capable of high-end functionality, scalability, and object-oriented capability. The Oracle 8.0 can support tens of thousands of concurrent customers.

In one embodiment, the encryption device (32) can be run on the input device (12). However, in this embodiment, the encryption device is prone to spoofing.

In one embodiment, the output device (46) can transfer a time dependent password to a remotely located potential customer using an antenna (50) and a communication link (48). The output device (46) can be implemented using a personal computer linked to the internet, a radio transmitter, and so on.

The communication link (48) can be implemented using: (1) a manual link; (2) a radiowave frequency band; (3) an internet network connected to the World Wide Web (WWW); (4) a microwave frequency band; (5) the ISM (industrial scientific medical) unlicensed operation band selected from a class of frequency range consisting of 900 MHz, 2.4 GHz, and 5.8 GHz; (6) a conventional telephone line; (7) a 1.8 GHz band supporting the personal communications services (PCS); (8) Low Earth Orbiting Satellites (LEOS) used to store and to forward digital packet data; (9) class of radiowave communication links consisting of a cellular telephone communication link, a paging signal receiving link, a wireless messaging link, a wireless application link, a wireless WAN/LAN station link, and an Earth-satellite-Earth communication link that uses at least one satellite to relay a radiowave signal; (10) an Advanced Mobile Phone System (AMPS) including a modem, wherein the modem is selected from a class consisting of a DSP (digital signal processor) modem, and a cellular digital packet data (CDPD) modem; or (11) a digital cellular telephone communication link including means of modulation of digital data over a radiolink selected from a class consisting of a time division multiple access (TDMA) system, and a code division multiple access (CDMA) system.

In another embodiment, the output device can record the time dependent password on a magnetic floppy disk, or an optical disk (such as a CD) and the disk can be manually transferred to a potential customer.

In one more embodiment, the output device can include a "PCMCIA PC card".

In one embodiment, the encryption device (32) further includes a clock to determine the current time coordinate. The current time coordinate may be useful to prioritize customers. Indeed, if the TDPG apparatus is used to generate a number of time dependent passwords for a number of different customers, the TDPG should start with customers whose requested time windows of operation expire first. This prevents unnecessary communication with customers until the potential customer actually needs the password. So, the transfer of passwords can also be prioritized.

In one embodiment, the current time coordinate can be determined using a SATPS (Satellite Positioning System) receiver (22) as a clock.

In the preferred embodiment, the SATPS antenna 23 is able to receive the satellite signals from at least one space-vehicle SV (24). The satellite-vehicle SV (24) should belong to the SATPS system.

Reference to a Satellite Positioning System (SATPS) herein refers to a Global Positioning System (GPS), to a Global Orbiting Navigation System (GLONASS), and to any other compatible satellite-based system that provides information by which the time of observation can be determined, all of which meet the requirements of the present invention.

The GPS is a system of satellite signal transmitters, with receivers located on the earth's surface or adjacent to the earth's surface, that transmits information from which an observer's present location and/or the time of observation can be determined.

The Global Positioning System (GPS) is part of a satellite-based navigation system developed by the United States Defense Department under its NAVSTAR satellite program. A fully operational GPS includes up to 32 earth satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries cesium and rubidium atomic clocks to provide timing information for the signals transmitted by the satellites. Internal clock correction is provided for each satellite clock.

Each GPS satellite transmits two spread spectrum, L-band carrier signals: an L1 signal having a frequency $f1=1575.42$ MHz and an L2 signal having a frequency $f2=1227.6$ MHz. These two frequencies are integral multiplies $f1=1540\ f0$ and $f2=1200\ f0$ of a base frequency $f0=1.023$ MHz. The L1 signal from each satellite is binary phase shift key (BPSK)

modulated by two pseudo-random noise (PRN) codes in phase quadrature, designated as the C/A-code and P(Y)-code. The L2 signal from each satellite is BPSK modulated by only the P(Y)-code. The nature of these PRN codes is described below.

Use of the PRN codes allows use of a plurality of GPS satellite signals for determining an observer's position and for providing the navigational and timing information or use of a single satellite to provide the timing information. A signal transmitted by a particular GPS satellite is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P(Y)-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P(Y)-code and is a relatively short, coarser-grained code having a clock or chip rate of f0=1.023 MHz. The C/A-code for any GPS satellite has a length of 1023 chips or time increments before this code repeats. The full P(Y)-code has a length of 259 days, with each satellite transmitting a unique portion of the full P(Y)-code. The portion of the P(Y)-code used for a given GPS satellite has a length of precisely one week (7.000 days) before this code portion repeats. Accepted methods for generating the C/A-code and P(Y)-code are set forth in the document GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System,* Tom Logsdon, Van Nostrand Reinhold, New York, 1992, pp. 17–90.

A second alternative configuration for the SATPS is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.80 relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the earth every 8 days. The GLONASS system uses two carrier signals L1 and L2 with frequencies of f1=(1.602+9k/16) GHz and f2=(1.246+7k/16) GHz, where k (=0,1,2, . . . 23) is the channel or satellite number. These frequencies lie in two bands at 1.597–1.617 GHz (L1) and 1,240–1,260 GHz (L2). The L1 code is modeled by a C/A-code (chip rate=0.511 MHz) and by a P(Y)-code (chip rate=5.11 MHz). The L2 code is presently modulated only by the P(Y)-code. The GLONASS satellites also transmit navigational data at a rate of 50 Baud. Because the channel frequencies are distinguishable from each other, the P(Y)-code is the same, and the C/A-code is the same, for each satellite. The methods for receiving and analyzing the GLONASS signals are similar to the methods used for the GPS signals.

A Satellite Positioning System (SATPS), such as the Global Positioning System (GPS) or the Global Orbiting Navigation Satellite System (GLONASS), uses transmission of coded radio signals, with the structure described above, from a plurality of earth-orbiting satellites.

A single passive SATPS receiver (22) of signals emanating from a single satellite is capable of determining the SATPS's receiver time coordinate.

FIG. 4 illustrates a flow chart (150) of a method of generating a time dependent password for operating an instrument using the TDPG apparatus of FIG. 1. The first step (152) is to receive at least one time dependent input parameter for operating the instrument using the input device (12). A customer will provide the unit's identification number at the time of order, the desirable option of operation of the instrument, the stop and the start times (or at least one time window) for enabling the purchased or leased option.

The next step (154) is to encrypt the option together with the identification number and together with at least one time window to provide a password using the encryption device (32). This step can include the application of the encryption algorithm to at least one chosen-by-the-user option, to at least one time window and to the identification number of the instrument.

Finally, the output device (46) utilizes the communication link (48) to transfer the time dependent password (step 156) to the user of the unit.

FIG. 2 depicts a time dependent password utilizing (TDPU) apparatus (60) that includes an input device (62) capable of receiving a time dependent password. In one embodiment, the time dependent password can be generated and transferred (using a communication link) from a time dependent password generator (TDPG) (10) of FIG. 1.

The input device (62) can be implemented using a personal computer linked to the internet, a modem connected to a standard telephone line, a receiver of radio signals, a barcode scanner, a floppy disk, an optical CD disk, a PCMCIA interface, or any other device having an interface with a communication link to the TDPG generator.

The TDPU apparatus (60) further includes a decryption device (68) connected to the input device (62). The decryption device (68) can be configured to process the time dependent password and to match the time dependent password with at least one time dependent parameter in order to activate the TDPU apparatus.

In the preferred embodiment, the decryption device (68) is embedded into a GPS-related instrument (60). The decryption device (68) can be implemented using a Motorola® manufactured microprocessor 68000 running an operating system VRTX® manufactured by Microtec Research Inc., San Jose, Calif.

In another embodiment, the decryption device (68) can be implemented using a Pentium® based personal computer running the Windows-95® operating system.

The decryption device can also include a database (74) that can be used to store the identification number (86) of the TDPU apparatus (60), and a purchased or leased time dependent option (88) with the certain time window (90, 92) of operation for the TDPU device (60). It is possible to purchase or lease different options for different time windows, so the database (74) can be used to keep track of different options active during different time windows.

The decryption device (68) can also include a decryption algorithm (70) and a decryption software (72) used to match the time dependent password (66) with the identification number of the TDPU device (86), purchased or leased option (88), and a time window (90, 92) when the purchased or leased option is active. The time dependent password can also include the decoding key for the decryption algorithm to make the decoding process as secure as possible.

The decryption device also includes a non-volatile memory unit (76) used for operation of the microprocessor (78).

The database (74) can be also implemented using a non-volatile memory unit. The non-volatile memory unit can include a battery backed-up Static RAM (SRAM) memory unit, an Electrically Erasable PROM (EEPROM/flash) memory unit; or a hard drive memory unit.

In one embodiment, the decryption algorithm (70) and software (72) can reside in the input block (62), such that the identification number is requested from the database (74) and an "option enable command" is sent from the input device (62) to the instrument (68).

In one embodiment, the TDPU device can include a real time clock (RTC) chip (75) with a battery back-up to determine whether the current time is within the time window of operation of the purchased or leased option. The RTC clock is embedded into the TDPU apparatus and therefore is prone to spoofing.

In another embodiment, the TDPU includes an antispoof timing device (80) configured to prevent the spoofing of the time window by the user.

In one embodiment, the antispoofing timing device (80) can include a SATPS receiver for determining the current time coordinate of the apparatus by utilizing SATPS satellite signals emanating from a single satellite (94).

In the preferred embodiment, the SATPS satellite (94) can include a GPS satellite. For example, a single GPS satellite can be used to set a RTC to within 10 msec of GPS time. In another embodiment, the SATPS satellite (94) can include a GLONASS satellite.

In one more embodiment, the antispoofing timing device (80) can comprise a pseudolite receiver for determining the current time coordinate of the apparatus by utilizing pseudolite signals. Yet, in another embodiment, the antispoof timing device can comprise a radio receiver for determining the current time coordinate of the apparatus by utilizing radio broadcast signals. In an additional embodiment, the antispoof timing device can comprise a TV receiver for determining the current time coordinate of the apparatus by utilizing TV broadcast signals.

The synchronization of the antispoofing timing device (80) to GPS, GLONASS, TV, or radio signals does not have to be a frequent operation. It can take place only when the antispoofing timing device drifted significantly as compared to the resolution of the option time window.

However, the usage of the antispoof timing device (80) enables the seller of an option to prevent the user from spoofing because the user is unable to interfere with the time transfer process to the antispoofing clock (80).

Thus, using start and end dates (or time windows), an anti-spoof option can be rented or leased. It is possible to extend a lease beyond the original time window by purchasing a new password. This could either be specified as a new "end date", or alternatively as an additional number of days to be added to the previous end date. It is considered that resolution of one day would be sufficient for most applications, but resolution to less than one second can be also provided.

Examples of time dependent options which can be purchased or leased for GPS applications are: RTK (real time kinematic) surveying, internal survey data-logging with specified memory size, and so on.

FIG. 5 shows the flow chart (160) of a method of leasing an instrument using a time dependent password.

At first (step 162), the time dependent password is received by the input device (62 of FIG. 2). After that step (164), the time dependent password is processed by the decryption device (68) to match the time dependent password with the identification number, purchase, option, and at least one time window. Thus, the step of processing the time dependent password further includes the sub-steps of: (1) determining the current time coordinate of operation of the instrument by using an antispoof timing device; (2) matching the time dependent password with an identification number of the instrument; and (3) matching the time dependent password with the at least one chosen-by-the-user option for operating the instrument. The option of operation of the instrument is enabled when the current time of the instrument is within at least one time window of operation of the instrument.

FIG. 3 illustrates a remote operated time dependent password utilizing apparatus R-TDPU (100).

In one embodiment, the R-TDPU apparatus (100) includes: an input device (102) configured to receive at least one time dependent input parameter for operating the instrument (140); (2) an encryption device (104) configured to encrypt at least one time dependent parameter and configured to generate at least one time dependent password; (3) an output device (110) configured to output at least one time dependent password to the user of the instrument; (4) an input-output device (120) configured to transmit at least one time dependent parameter to the input device (102) and configured to receive at least one time dependent password from the output device (110); (5) a communication link (116) between the input device, the output device and the input-output device; and (6) a decryption device (124) configured to process at least one time dependent password and configured to match at least one time dependent password with the identification number, purchased or leased option and at least one time window in order to activate the instrument (140).

Referring to the given-above discussion of the TDPG apparatus (10) of FIG. 1, the input device (102) of apparatus R-TDPU (100) of FIG. 3 can be implemented using the same hardware as was discussed in connection with the implementation of input device (12) of TDPG apparatus (10). The encryption device (104) of apparatus R-TDPU (100) of FIG. 3 can be also implemented using the same hardware and software components of the encryption device (32) of TDPG apparatus (10) of FIG. 1. Similarly, the output device (110) of apparatus R-TDPU (100) of FIG. 3 can be implemented using the same hardware and software components of the output device (46) of TDPG apparatus (10) of FIG. 1.

In one embodiment, the input-output device (120) of FIG. 3 can be implemented using a transceiver for receiving and transmitting the radio waves, if the input device (102) is the receiver and the output device (110) is the transmitter of radio waves, and the communication link (116) (see discussion above) is suitable for radio wave propagation.

In another embodiment, the input-output device (120) can be a personal computer communicating with the output device (110) (also a personal computer) and the input device (102) (also a personal computer) via the communication link (116) comprising the internet.

In general (also see discussion above), the communication link (116) can comprise: (1) an infrared frequency band; (2) a radiowave frequency band; (3) an internet; (4) a microwave frequency band; (5) the ISM (industrial scientific medical) unlicensed operation band selected from a class of frequency range consisting of 900 MHz, 2.4 GHz, and 5.8 GHz; (6) a conventional telephone line; (7) a 1.8 GHz band supporting the personal communications services (PCS); (8) Low Earth Orbiting Satellites (LEOS) used to store and to forward digital packet data; (9) class of radiowave communication links consisting of a cellular telephone communication link, a paging signal receiving link, a wireless messaging link, a wireless application link, a wireless WAN/LAN station link, and an earth-satellite-earth communication link that uses at least one satellite to relay a radiowave signal; (10) an Advanced Mobile Phone System (AMPS) including a modem, wherein the modem is selected from a class consisting of a DSP (digital signal processor) modem, and a cellular digital packet data (CDPD) modem; or (11) a digital cellular telephone communication link including means of modulation of digital data over a radiolink selected from a class consisting of a time division multiple access (TDMA) system, and a code division multiple access (CDMA) system.

The decryption device (124) can be implemented using the hardware and software components of the decryption device (68) of the TDPU apparatus (60) of FIG. 2.

The antispoofing clock (122) of the R-TDPU apparatus has the same functions as the antispoof clock (80) of the TDPU apparatus (68) of FIG. 2.

In the preferred embodiment, the antispoof clock (122) can be implemented using the GPS receiver capable of receiving the satellite signals emanating from at least one GPS satellite (130).

In another embodiments, the antispoof clock can be a GLONASS receiver, a pseudolite receiver, a radio receiver, or a TV broadcast receiver.

FIG. 6 depicts the flow chart (180) of a method for remotely operating the R-TDPU apparatus of FIG. 3.

At first step (181), the output part of the input-output device (120) of the R-TDPU apparatus of FIG. 3 transmits using the communication link (116) to the input device (102) the newly acquired option of operation of the unit (140), or another time window of operation of the already purchased or leased option, or both, in order to receive the new time dependent password. At next step (182), the input device (102) using the communication link (116) receives the required option of operation and the time window for operating the instrument (140). In the step (184), the encryption device (104) encrypts at least one time dependent parameter and at the next step (185) generates the time dependent password. The time dependent password is transferred in the step (186) using the output device (110) and the communication link (116) to the output-input device (120) to the user of the instrument (140).

After the time dependent password is received (step 188) using the input part of the input-output device (120) of the R-TDPU apparatus of FIG. 3, it is processed (step 190) by the decryption device (124) to match the time dependent password with the identification number, purchased option and the time window.

The description of the preferred embodiment of this invention is given for the purposes of explaining the principles thereof, and is not to be considered as limiting or restricting the invention since many modifications may be made by the exercise of skill in the art without departing from the scope of the invention.

What is claimed is:

1. An apparatus for generating a time dependent password useful in operating an instrument, said apparatus comprising:
   an input device configured to receive at least one time dependent input parameter for operating said instrument;
   an encryption device connected to said input device, wherein said encryption device is configured to encrypt said at least one time dependent parameter and is configured to generate said time dependent password;
   an output device connected to said encryption device, wherein said output device outputs said time dependent password; and wherein said time dependent password is generated only once for each rented or leased option for operating said instrument; and
   an antispoof timing device coupled to said input device, coupled to said encryption device, and coupled to said output device; wherein said antispoof timing device is configured to prevent the spoofing of said time dependent password by the user.

2. The apparatus of claim 1;
   wherein said input device further comprises: a personal computer including an interface selected from a class of interfaces capable of reading the input data consisting of a magnetic floppy disk drive, a CD ROM drive, a PCMCIA PC card reader, a manual keyboard, a barcode scanner, and a modem connected to an internet server memory; and
   wherein said input device is configured to receive an identification number of said instrument, at least one chosen-by-the-user option for operating said instrument, at least one start date to start the operation of said instrument and at least one stop date to stop the operation of said instrument; and
   wherein said at least one start date and said at least one stop date comprise at least one time window for operation of said instrument, and
   wherein said personal computer applies said algorithm to each said chosen-by-the-user option, to each said time window and to said identification number of said instrument in order to generate said time dependent password only once for each said chosen-by-the-user option for operating said instrument.

3. The apparatus of claim 1, wherein said output device further comprises:
   a personal computer including an interface selected from a class of interfaces capable of recording a time dependent password consisting of a magnetic floppy drive, CD ROM recorder, a PCMCIA PC card recorder, and a modem connected to an internet server memory.

4. The apparatus of claim 1, wherein said output device further comprises:
   a radio transmitter.

5. The apparatus of claim 1, wherein said antispoof timing device further includes:
   a SATPS receiver for determining a current time coordinate of said apparatus, wherein said time dependent password further depends on said current time coordinate.

6. An apparatus utilizing a time dependent password for its activation, said apparatus comprising:

an input device configured to receive said time dependent password for its activation;
and
a decryption device connected to said input device; wherein said decryption device is configured to process said time dependent password and is configured to match said time dependent password with an identification number of said apparatus, with at least one chosen-by-the-user option for operating said apparatus, with at least one start date and with at least one stop date, in order to activate said apparatus, wherein said at least one start time and said at least one stop time define at least one time window of operation of said apparatus;
and wherein said time dependent password is generated only once for each said chosen-by-the-user option for operating said apparatus.

7. The apparatus of claim 6 further comprising:
an antispoof timing device configured to determine the current time coordinate of operation of said apparatus, and wherein said option is enabled if the current time coordinate is within said at least one time window of operation of said apparatus, and wherein said antispoof timing device is configured to prevent the spoofing of each said time window by the user.

8. The apparatus of claim 7, wherein said antispoof timing device comprises:
a SATPS receiver for determining the current time coordinate of said apparatus by utilizing SATPS satellite signals.

9. The apparatus of claim 7, wherein said antispoof timing device comprises:
a GPS receiver for determining the current time coordinate of said apparatus by utilizing GPS satellite signals.

10. The apparatus of claim 7, wherein said antispoof timing device comprises:
a radio receiver for determining the current time coordinate of said apparatus by utilizing radio broadcast signals.

11. The apparatus of claim 7, wherein said antispoof timing device comprises:
a TV receiver for determining the current time coordinate of said apparatus by utilizing TV broadcast signals.

12. The apparatus of claim 6, wherein said input device further comprises:
a personal computer including an interface selected from a class of interfaces capable of reading the input data consisting of a CD ROM drive, a PCMCIA PC card reader, a manual keyboard, a barcode scanner, and a modem connected to an internet server memory.

13. The apparatus of claim 6, wherein said input device further comprises:
a radio receiver.

14. The apparatus of claim 6, wherein said decryption device further comprises:
a personal computer using a decryption algorithm.

15. The apparatus of claim 6 further comprising:
a non-volatile memory unit configured to store the identification number of said apparatus, the chosen-by-the-user option of operation of said apparatus, and at least one chosen-by-the-user time window of operation of said apparatus.

16. The apparatus of claim 15, wherein said non-volatile memory unit further includes:
a battery backed-up Static RAM (SRAM) memory unit.

17. The apparatus of claim 15, wherein said non-volatile memory unit further includes:

an Electrically Erasable PROM (EEPROM/flash) memory unit.

18. The apparatus of claim 15, wherein said non-volatile memory unit further includes:
a hard drive memory unit.

19. An apparatus utilizing a time dependent password for remotely operating an instrument, said apparatus comprising:
an input device configured to receive at least one time dependent input parameter for operating said instrument including an identification number of said instrument, chosen-by-the-user at least one option of operation of said instrument, at least one start date and at least one stop date of operation of said instrument, wherein said start date and said stop date comprise at least one time window;
an encryption device connected to said input device, wherein said encryption device is configured to encrypt said at least one time dependent parameter and is configured to generate said time dependent password; and
wherein said time dependent password is generated only once for each said chosen-by-the-user option of operation of said instrument;
an output device connected to said encryption device, wherein said output device outputs said time dependent password to the user of said instrument;
an input-output device configured to transmit said at least one time dependent input parameter for operating said instrument to said input device, and configured to receive said time dependent password from said first output device;
a decryption device connected to said input-output device, wherein said decryption device is configured to process said time dependent password and is configured to match said time dependent password with said at least one time dependent parameter;
and
an antispoof timing device configured to determine the current time coordinate of operation of said apparatus, and wherein said antispoof timing device is configured to prevent the spoofing of said time dependent password.

20. The apparatus of claim 19, wherein said input device further comprises:
a personal computer including an interface selected from a class of interfaces capable of reading the input data consisting of a CD ROM drive, a PCMCIA PC card reader, a manual keyboard, a barcode scanner, and a modem connected to an internet server memory.

21. The apparatus of claim 19, wherein said input device further comprises:
a radio receiver.

22. The apparatus of claim 19, wherein said output device further comprises:
a personal computer including an interface selected from a class of interfaces capable of recording a time dependent password consisting of a magnetic floppy drive, CD ROM recorder, a PCMCIA PC card recorder, and a modem connected to an internet server memory.

23. The apparatus of claim 19, wherein said output device further comprises:
a radio transmitter.

24. The apparatus of claim 19, wherein said encryption device further comprises
a personal computer using an encryption algorithm.

25. The apparatus of claim 19, wherein said input-output device further comprises:
a personal computer including an interface selected from a class of interfaces capable of reading the input data consisting of a CD ROM drive, a PCMCIA PC card reader, a manual keyboard, a barcode scanner, and a modem connected to an internet server memory.

26. The apparatus of claim 19, wherein said input-output device further comprises:
a radio receiver.

27. The apparatus of claim 19, wherein said input-output device further comprises:
a personal computer including an interface selected from a class of interfaces capable of recording a time dependent password consisting of a magnetic floppy drive, CD ROM recorder, a PCMCIA PC card recorder, and a modem connected to an internet server memory.

28. The apparatus of claim 19, wherein said input-output device further comprises:
a radio transmitter.

29. The apparatus of claim 19, wherein said decryption device further comprises
a personal computer using a decryption algorithm.

30. The apparatus of claim 19 further comprising a communication link.

31. The apparatus of claim 30, wherein said communication link further comprises:
a radiowave frequency band.

32. The apparatus of claim 30, wherein said communication link includes:
an internet coupled to a conventional telephone line.

33. The apparatus of claim 30, wherein said communication link includes:
a microwave frequency band.

34. The apparatus of claim 30, wherein said communication link is selected from a class of radiowave communication links consisting of a cellular telephone communication link, a paging signal receiving link, a wireless messaging link, a wireless application link, a wireless WAN/LAN station link, and an earth-satellite-earth communication link that uses at least one satellite to relay a radiowave signal.

35. The apparatus of claim 19, wherein said antispoof timing device comprises:
an antispoof clock for determining the current time coordinate of said instrument.

36. The apparatus of claim 19, wherein said antispoof timing device comprises:
a SATPS receiver for determining the current time coordinate of said instrument by utilizing SATPS satellite signals.

37. The apparatus of claim 19, wherein said antispoof timing device comprises:
a GPS receiver for determining the current time coordinate of said instrument by utilizing GPS satellite signals.

38. The apparatus of claim 19, wherein said antispoof timing device comprises:
a pseudolite receiver for determining the current time coordinate of said instrument by utilizing pseudolite signals.

39. The apparatus of claim 19, wherein said antispoof timing device comprises:
a radio receiver for determining the current time coordinate of said instrument by utilizing radio broadcast signals.

40. The apparatus of claim 19, wherein said antispoof timing device comprises:
a TV receiver for determining the current time coordinate of said instrument by utilizing TV broadcast signals.

41. The apparatus of claim 19 further comprising:
a non-volatile memory unit configured to store said identification number of said instrument, each said option of operation of said instrument, and each said time window of operation of said instrument.

42. A method of generating a time dependent password for operating an instrument, said method comprising the steps of:
receiving an identification number of said instrument;
receiving at least one chosen-by-the-user option for operating said instrument;
receiving at least one start date to start the operation of said instrument;
receiving at least one stop date to stop the operation of said instrument; wherein said at least one start date and said at least one stop date comprise at least one time window for operation of said instrument;
and
encrypting at least one said time dependent parameter to generate said time dependent password: wherein said time dependent password is generated only once for each said chosen-by-the-user option for operating said instrument.

43. The method of claim 42, wherein said step of encrypting further includes the step of:
applying an encryption algorithm to said at least one chosen-by-the-user option, to said at least one time window and to said identification number of said instrument in order to generate said time dependent password.

44. A method of leasing an instrument using a time dependent password; said method comprising the steps of:
receiving said time dependent password; and
processing said time dependent password to match said time dependent password with at least one time dependent parameter;
wherein said time dependent password is generated only once for each said leasing option for operating said instrument.

45. The method of claim 44, wherein said step of processing said time dependent password further includes the steps of:
matching said time dependent password with an identification number of said instrument;
matching said time dependent password with said at least one chosen-by-the-user option for operating said instrument;
determining the current time coordinate of operation of said instrument by using an antispoof timing device; and
matching the current time with each said time window for operation of said instrument;
wherein said at least one option of operation of said instrument is enabled when the current time of said instrument is within said at least one time window of operation of said instrument.

46. A method for remotely operating an instrument using a time dependent password, said method comprising the steps of:

receiving at least one time dependent input parameter for operating said instrument;

encrypting said at least one time dependent parameter;

generating said time dependent password; wherein said time dependent password is generated only once for a chosen-by-the-user option for operating said instrument:

transferring said time dependent password to the user of said instrument;

receiving said time dependent password by the user of said instrument; and processing said time dependent password to match said time dependent password with said at least one time dependent parameter.

* * * * *